(12) United States Patent
Landolt et al.

(10) Patent No.: US 6,405,434 B2
(45) Date of Patent: Jun. 18, 2002

(54) METHOD FOR PRODUCING A SPINNING ROTOR

(75) Inventors: Claus-Dieter Landolt, Mönchengladbach; Dieter Haaken, Erkelenz; Fernando Segura; Ralf Bohne, both of Mönchengladbach, all of (DE)

(73) Assignee: W. Schlafhorst AG & Co. (DE)

( * ) Notice: Subject to any disclaimer, the term of this patent is extended or adjusted under 35 U.S.C. 154(b) by 0 days.

(21) Appl. No.: 09/973,583

(22) Filed: Oct. 9, 2001

Related U.S. Application Data

(62) Division of application No. 09/521,821, filed on Mar. 9, 2000, now Pat. No. 6,321,522.

(30) Foreign Application Priority Data

Mar. 9, 1999 (DE) ......................................... 199 10 276

(51) Int. Cl.[7] ................................................. B23P 15/00
(52) U.S. Cl. ........................ 29/889; 29/901; 29/407.04
(58) Field of Search ...................... 29/889, 901, 407.04, 29/407.01; 57/414, 404, 408

(56) References Cited

U.S. PATENT DOCUMENTS

| | | | |
|---|---|---|---|
| 3,914,067 A | * 10/1975 | Leto | 403/343 |
| 3,935,746 A | 2/1976 | Moll et al. | 73/462 |
| 4,150,530 A | 4/1979 | Derichs | 57/263 |
| 4,777,813 A | 10/1988 | Hoffmann et al. | 72/85 |
| 5,201,116 A | * 4/1993 | Kikuchi et al. | 29/888.021 |
| 5,206,988 A | * 5/1993 | Piramoon | 29/557 |
| 5,526,638 A | 6/1996 | Bock et al. | 57/404 |
| 5,921,148 A | * 7/1999 | Howell | 29/598 |
| 5,992,232 A | * 11/1999 | Saitoh | 29/901 |
| 6,009,700 A | 1/2000 | Wassenhoven et al. | 57/263 |
| 6,195,976 B1 | 3/2001 | Wassenhoven et al. | 57/414 |
| 6,205,761 B1 | 3/2001 | Wassenhoven et al. | 57/414 |
| 6,292,992 B1 | * 9/2001 | Kuhl | 279/102 |

FOREIGN PATENT DOCUMENTS

| | | |
|---|---|---|
| DE | 43 12 365 A1 | 10/1994 |
| DE | 43 39 064 A1 | 5/1995 |
| DE | 197 55 060 A | 12/1997 |
| EP | 0 099 490 B1 | 2/1984 |

* cited by examiner

*Primary Examiner*—I Cuda Rosenbaum
(74) *Attorney, Agent, or Firm*—Kennedy Covington Lobdell & Hickman, LLP

(57) ABSTRACT

A spinning rotor for open-end spinning machines and a method for balancing the spinning rotor in the course of a single clamping process by removing material from a cylindrical-shaped section of the collar (20) of the rotor cup (19) to form an identification mark (21) thereon sufficiently to offset an imbalance and equalize the mass of the rotor. The mark (21), which preferably consists of a combination of a graphic symbol (22) and lettering (23), is used for identification and information.

10 Claims, 2 Drawing Sheets

METHOD FOR PRODUCING A SPINNING ROTOR

CROSS-REFERENCES TO RELATED APPLICATIONS

This application is a divisional application of U.S. Ser. No. 09/521,821, filed Mar. 9, 2000, now U.S. Pat. No. 6,321,522 which claims the benefit of German patent application DE19910276.7, filed Mar. 9, 1999, herein incorporated by reference.

FIELD OF THE INVENTION

The present invention relates to a spinning rotor for open-end spinning machines, wherein the rotor has a rotor cup with a collar and is suitable for a high number of rotor revolutions, and relates further to a method for producing such a spinning rotor.

BACKGROUND OF THE INVENTION

With rapidly rotating bodies, for example spinning rotors, an imbalance occurs when the mass of the body is distributed in such a way that the center of gravity lies outside of the axis of rotation, or if the axis of rotation and the axis of inertia are not coincident. The imbalance results in undesired reaction forces during the rotation of the body causing uneven running or vibrations, which in particular increase considerably as rotational speed increases and/or in certain frequency ranges. Undesired results can occur, for example, loud noises, malfunctions, wear or even destruction of the rotor, which require maintenance or the replacement of such unbalanced components. Expense and downtime are created because of maintenance and replacement work, and the efficiency and/or the productivity, of the machine is negatively affected.

To prevent such disadvantages, dynamic balancing is customarily performed as a portion of the production process of such rapidly rotating bodies. In some cases, the mass equalization of the body can be accomplished by the installation of weights or in most cases by the removal of material from the body.

Presently the operating speed of spinning rotors in open-end spinning machines already is greater than 100,000 rpm. With such high numbers of revolution, the bearings and drive mechanisms of the spinning rotors are exposed to enormous stresses, together with the above described disadvantages, even in cases of small imbalances. It is therefore well known that it is imperative to not only produce spinning rotors with the highest precision in shape, but also to balance them carefully. In accordance with the known prior art, the balancing the spinning rotors by the removal of material is accomplished by grinding its exterior circumference. Grinding is customarily performed on the rotor cup at the end edge of the collar and at the exterior circumference at the location of its greatest circumference. Balancing of this type is known, for example, from European Patent Document EP 0 099 490 B1, as well as German Patent Publication DE 43 12 365 A1.

Balancing, already described as the prior art in European Patent Document EP 0 099 490 B1, is performed by grinding the exterior circumference of the spinning rotor. Although the removal of material as described in this reference has a considerable effect, the relatively thin wall of open-end spinning rotors, particularly in those rotors formed by a non-cutting formation process, is weakened at a critical point. In European Patent Document EP 0 099 490 B1 it is already expressly pointed out that such weakening must be absolutely avoided in view of the high number of rotor revolutions which is customary today. A balancing method is therefore disclosed in this reference wherein a first production step accomplishes mass equalization by initially punching a hole through the bottom of the rotor cup in the course of the compression process, and thereafter the hole may be enlarged to a degree sufficient for mass equalization. Such method, however, is expensive, time-consuming and, in particular, is limited to spinning rotors made by plastic deformation, for example from sheet metal.

German Patent Publication DE 43 12 365 A1 describes a rotor balancing method by grinding of the rotor collar. However, the considerable outlay required in the course of such balancing is disadvantageous.

German Patent Publication DE 43 39 064 A1 discloses a balancing method wherein balancing is performed by means of a pulsating laser beam. The pulse frequency of the laser beam is synchronized with the rotating speed of the rotor within an imbalance measuring device during the balancing process, such that the laser removes material when the unbalanced portion of the rotor turns past the impact point of the laser on the surface of the rotor. However, this method does not operate with sufficient precision for the exact balancing necessary to meet the desired quality requirements to balance the body for operation at high numbers of revolution. The exact guidance of the rotor during the rotating movement in the course of the balancing process is an absolute prerequisite for precise balancing by means of such a method, but is either too inaccurate or extraordinarily elaborate and therefore too expensive.

SUMMARY OF THE INVENTION

It is accordingly an object of the present invention to achieve further improvements in regard to the balancing of open-end spinning rotors.

In accordance with the invention, this object is attained by a spinning rotor basically comprising a rotor cup with a collar. The spinning rotor is made suitable for operation at a high number of rotor revolutions in an open-end spinning machine by the formation thereon of at least one identification mark created by the removal of material from a selected exterior surface of the rotor cup or the collar, the identification mark being formed at a selected position on the exterior surface and to a selected removal depth for mass equalization of the spinning rotor.

Such a spinning rotor in accordance with the present invention is distinguished by good balancing qualities. The identification mark is accomplished by a precisely metered removal of material. The increased balancing quality leads to quieter running and thus can improve the functional properties of the spinning rotor, in particular the operational dependability of the spinning rotor, and therefore the productivity of the spinning station. The spinning rotor in accordance with the invention does not require any additional removal of material besides the identification mark, such as an interfering notch or cutout, for example, which can lead to undesired and disadvantageous interference with the boundary layer flow or to an impermissible weakening of the stability of the spinning rotor. It is possible to keep the removal depth extremely slight by distributing the material removal over the entire surface of the identification mark, and it therefore has an advantageous effect on the surrounding airflow at high numbers of revolutions of the spinning rotor. A flow-efficient spinning rotor in accordance with the invention reduces energy consumption, particularly at such high numbers of revolutions, is cost-effective because of the reduction of outlay and time during its production, and in this manner allows a considerable cost savings in connection with the customary design of the open-end spinning machines with a plurality of spinning stations.

The identification mark produced by the removal of material is essentially permanent and easily recognizable. It can be used for identification and/or information. For this purpose the identification mark preferably consists of lettering or a graphic symbol, or alternatively a combination of lettering and a graphic symbol.

Advantageously the identification mark is arranged on the exterior circumference of the collar of the spinning rotor, preferably on a cylinder-shaped section of the collar. At this location the material removal is very effective as a mass equalization, without negatively affecting the air resistance or the stability of the spinning rotor, such as otherwise occurs by the notching of the exterior radius of the largest diameter of the rotor cup in accordance with the prior art. It is thus possible to avoid the material removal at the exterior radius of the greatest diameter of the rotor cup, as well as at the edge of the collar toward the shaft, otherwise customary in the course of balancing methods of the prior art, by the effective positioning of the identification mark on the cylinder-shaped section of the collar. Such a double removal of material, created during balancing by grinding at two axially spaced-apart locations, has heretofore often been considered to be imperative.

According to another aspect of the present invention, a method is provided for producing a spinning rotor of the type described suitable for operation at a high number of rotor revolutions in an open-end spinning machine. Briefly summarized, the method basically comprises the steps of initially forming the spinning rotor in a selected shape having a rotor cup and a collar, determining an imbalance in the spinning rotor and an angular position and a size of the imbalance, determining an amount of material to remove from the spinning rotor for mass equalization thereof to offset the imbalance, and removing material from the spinning rotor for equalization of the mass as a function of the angular position and size of the imbalance. As described, the removal of material comprises forming at least one identification mark on the spinning rotor by removing material from a selected exterior surface of the rotor cup or collar and at a selected position on the exterior surface and to a selected removal depth for mass equalization of the spinning rotor. Advantageously, therefore, the creation of such an identification mark can take place simultaneously with the unavoidable mass equalization balancing process in a single method which achieves a considerable savings in time and makes it possible to remove material in a controlled fashion with extraordinary exactitude.

The material removal preferably is performed by guiding a laser beam over the area of the identification mark to be created, which permits a clean and even design of the form of, and the bottom surface within, the identification mark. To this end, it is preferred that the direction of the laser beam be guided by at least one deflection means, in particular an optical device, which makes the guidance simple and precise. The material removal can be exactly controlled or metered by means of the laser beam, is reproducible and can be performed as an automated process.

The removal depth required to achieve mass equalization is preferably calculated on the basis of the size of the removal surface of the identification mark. In the process, the removal depth is advantageously increased in steps. In this manner, a desired uniform appearance of identical rotor types of the mass-produced spinning rotors is achieved, and the required amount of calculation is clearly reduced, since the calculation can be made simpler and more rapidly.

A further simplification and considerable increase in the speed of the determination of the removal depth is achieved in that the respective relationship of shape, surface and removal depth is stored in look-up tables for different identification marks and balance values. Stepped removal depths in particular make the allocation easier, limit the amount of data to be stored and improve the possibilities of their reuse. In this case, the calculation of the removal depth can be omitted entirely, or at least to a large extent. The determination of the removal depth can be limited to the relationship of shape, surface and removal depth of an identification mark to a determined balance value.

The identification mark is preferably provided at least partially as lettering or as a graphic symbol, and as a result, the number of the symbols to be stored can be limited and manageable. The identification or the information can be stored and called-up by known means or information carriers.

Advantageously, if the output of the laser beam is regularly submitted at predetermined time intervals to a preventive or state-dependent calibration process, and if output deviations from a predetermined command value detected in the course of such calibration are compensated by a regulating process performed by a control device, the output of the laser beam remains constant so that the material removal is always performed under reproducible conditions.

The method of the present invention is particularly advantageous for manufacturing a balanced spinning rotor. In a preferred embodiment, the method includes the steps of initially placing the spinning rotor into a receiver of a balancing device operated by means of a laser beam and causing the spinning rotor to rotate in the receiver. The angular position of the spinning rotor may then be detected via a marker and an imbalance of the spinning rotor is measured while being rotated by the receiver at controlled revolutions. A position and a size of the imbalance is determined via a control unit of the balancing device and the volume of material to be removed is calculated, using spinning rotor-specific values. A position, shape and depth of the identification mark required for mass equalization is determined via the control unit of the balancing device. The spinning rotor is rotated to dispose the imbalance underneath the laser beam and within an effective range of the laser beam, and then, while the spinning rotor is not rotating, the laser beam is projected onto the exterior surface of the spinning rotor at an intensity and for a duration of the laser beam matched to the material to be removed.

The present method may be performed rapidly and dependably, results in spinning rotors of high balance quality, requires only small operating outlays since it can be automated, and has a high degree of reproducibility, without being compromised by manual error sources or inadequacies. The identification mark produced is permanent and can be clearly and unambiguously recognized. In particular, the creation of at least one identification symbol in one work step as part of the inevitable mass equalization during balancing permits a significant reduction of the manufacturing outlay and accomplishes a material removal which can be extremely accurately regulated, thereby to achieve a high degree of balance quality. A spinning rotor produced in this manner has improved operating properties, leads to an increase in the dependability and efficiency of the spinning station, a decrease in costs and an increase in productivity.

Further details, features and advantages of the invention will be understood from the following disclosure with reference to the accompanying drawing figures.

DETAILED DESCRIPTION OF A PREFERRED EMBODIMENT

Figure 1:
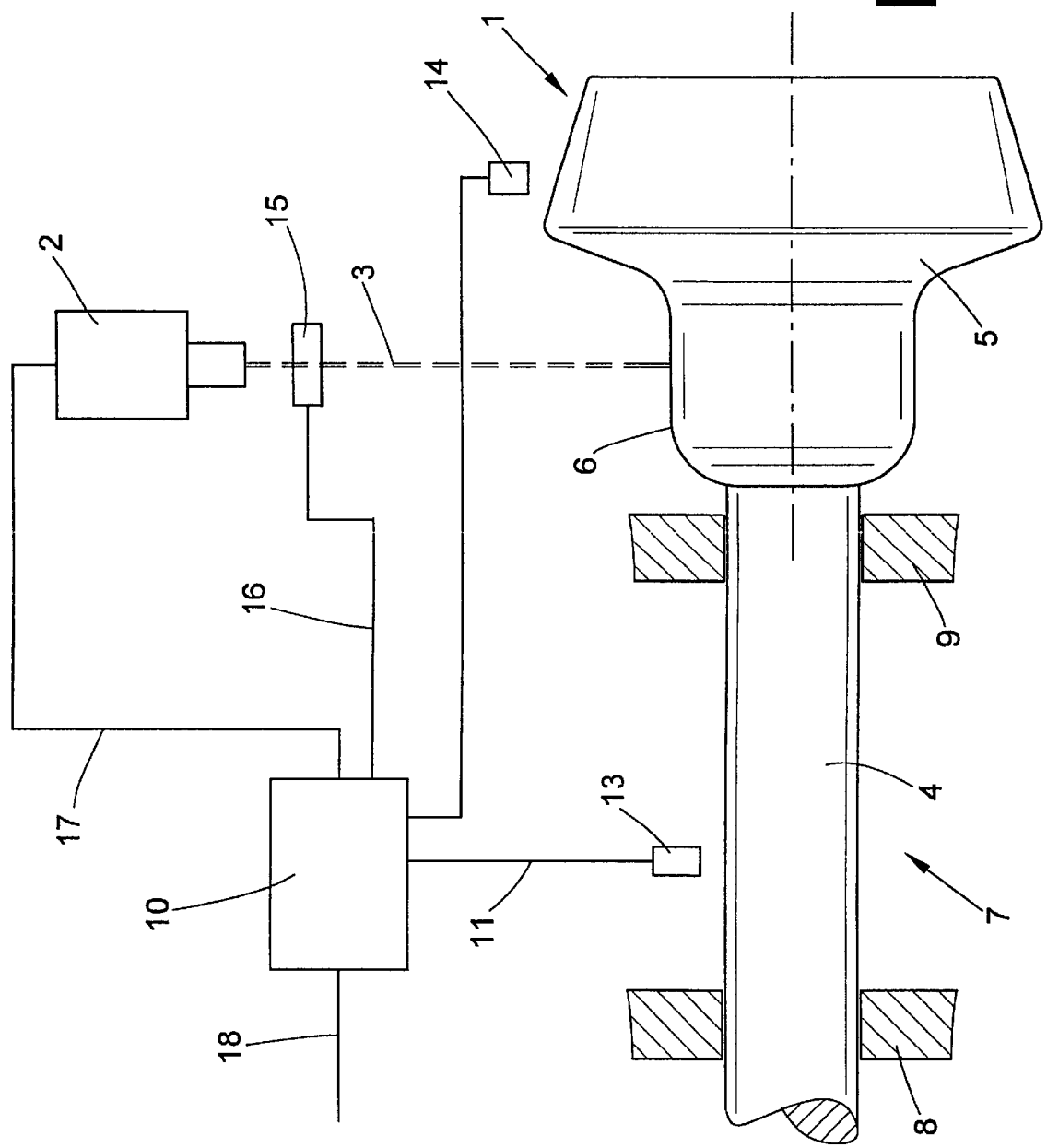
FIG. 1 is a schematic representation of a balancing device for executing the method in accordance with the present invention.

Balancing of a spinning rotor 1 by the removal of material by means of a laser beam 3 emitted by a laser arrangement 2 is accomplished in accordance with the present invention by the balancing device represented in FIG. 1, wherein the removal of material is simultaneously used for applying an identification mark. The spinning rotor 1 consists of a rotor shaft 4 and a rotor cup 5 having a hub-like collar 6. The rotor cup 5 is fixedly connected with the rotor shaft 4 in a known manner by means of the collar 6. The spinning rotor 1 is preliminarily prepared for balancing by means of a shaping process in a known manner, is rotatably seated in a receiver 7 which has two bearings 8, 9 for this purpose. The end of the rotor shaft 4 located opposite the rotor cup 5 is releasably held by a clamping device, known per se in connection with balancing devices and not shown or explained in detail for reasons of simplicity, and can be caused to rotate in a controlled manner. Alternatively it is also possible to design the receiver for the spinning rotor 1 in accordance with the principle of the rotor cup bearing customary and known in connection with the spinning stations of an open-end spinning machine, and the rotating movement can be imparted to the spinning rotor by means of a friction wheel.

The balancing device represented in FIG. 1 has a control device 10, by means of which data can be processed and stored, and by means of which not only the removal of material by the laser beam 3, but the entire balancing process, can be controlled. The control device 10 is connected via lines 11, 12 with sensors 13, 14 for detecting vibrations caused by imbalances during the rotating movement of the spinning rotor 1, or for detecting markings for determining the angular position. Alternatively, the sensors 13, 14 can also be positioned at other locations. The laser arrangement 2 is positioned such that the outer surface of the rotor cup 5 of the spinning rotor 1 seated in the receiver 7 faces the laser arrangement 2 and is within the effective range of the laser beam 3. A deflection means 15, preferably in the form of an optical device, affects the direction of the laser beam 3 in a known manner and is controlled by the control device 10 via the line 16. The line 17 connects the control device 10 and the laser arrangement 2. The control device 10 is connected via the line 19 with the above mentioned clamping device and also controls the latter. Not only can the control be performed via the lines 11, 12, 16, 17, 18, but also the energy supply is additionally controllable if required, from a voltage source not represented for reasons of simplicity, to which the clamping device is also connected.

Figure 2:
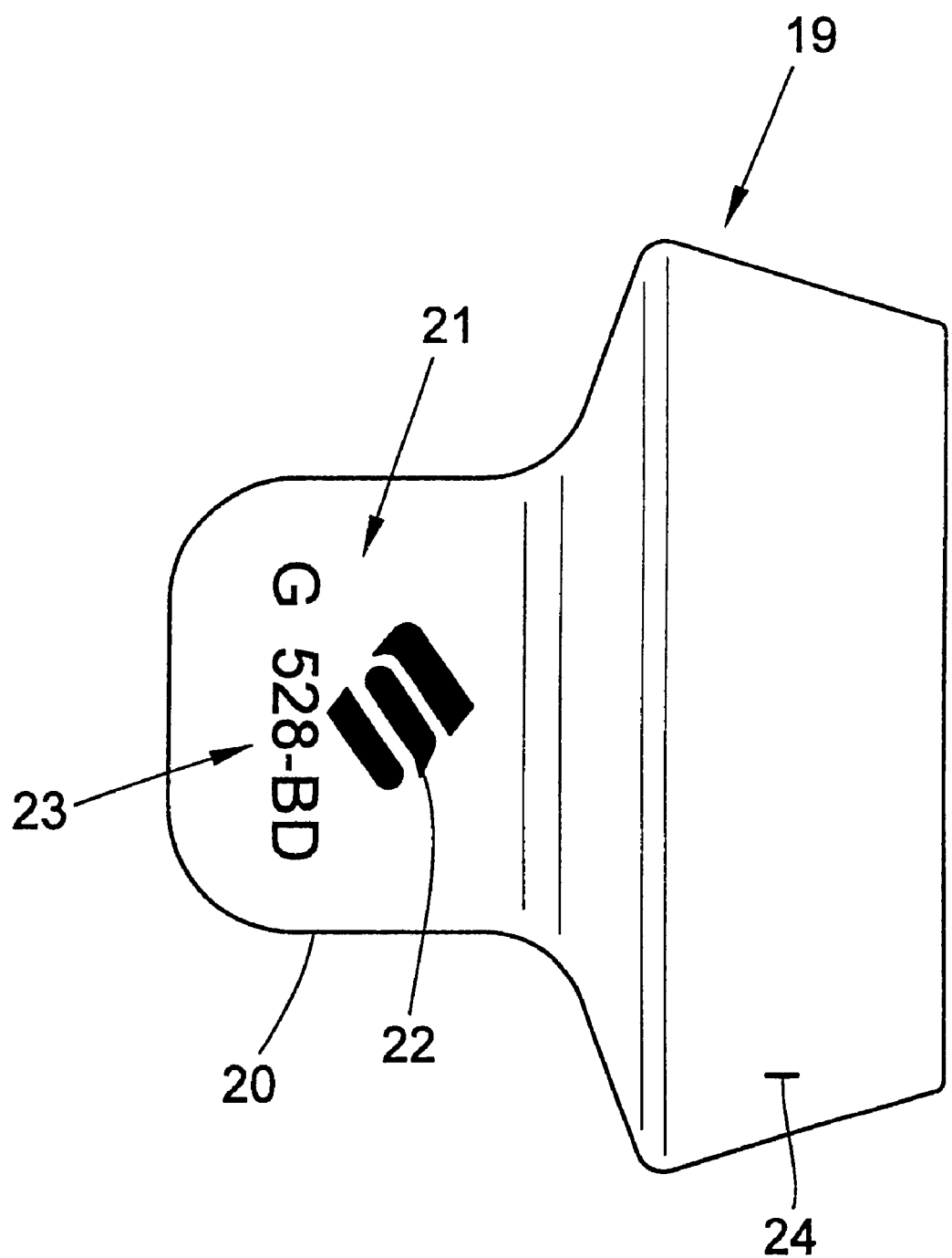
FIG. 2 is a side elevational view of a rotor cup with an identification mark in accordance with the present invention.

On the exterior surface of the cylindrical-shaped section of its collar 20, the rotor cup 19 of a spinning rotor represented in FIG. 2 has an identification mark 21, consisting of a graphic symbol 22 and alpha-numeric characters 23 created in accordance with the invention by the removal of material by means of the laser beam 3. The marker 24 has also been created by means of a laser beam 3 and can also be applied to another location of the exterior surface of the rotor cup 19, as long as this location can be covered by the laser beam 3 in the balancing device. The methodology of forming the identification mark 21 may thus be understood. The spinning rotor 1, in a form produced in a known manner, e.g., by machining, and prepared for balancing, is inserted into the receiver of the balancing device operating by means of a laser beam. The end of the rotor shaft 4 located opposite the rotor cup 5 is releasably and rotatably held by means of the aforementioned known clamping device. The marker 24 is applied at a predetermined location to the exterior of the rotor cup 5 by means of the laser beam 3, wherein the intensity and duration of the effect of the laser beam 3 are controlled in such a way that the marker 24 can be created not by the removal of material, but merely by a noticeable change in the reflecting property of the surface of the rotor cup 5. The marker 24 may then be used to detect the angular position of the spinning rotor, or in addition also for measuring the number of revolutions of the rotor, and can consist of a line, as in the exemplary embodiment. For this purpose, the position of the marker 24, or the passage of a predetermined measuring point, is detected by a sensor device, which functions in a manner known per se and therefore is not represented for reasons of simplicity, and the measured data are transmitted to the control device 10. Subsequently, a rotating movement of a measured number of rotations controlled by the control device 10 is imparted to the spinning rotor 1, and the size and angular position of the imbalance is determined in a known manner by the control device 10 of the balancing device by means of the vibrations generated by the unbalanced mass and, in turn, the imbalance is detected by the sensors 13, 14. For example, the angular position of the unbalanced mass may be located at 312.5 degrees from the marker 24 and its mass 35 mg. Unbalanced masses of spinning rotors prior to balancing customarily lie between 20 to 50 mg, and can be up to 100 mg in particular cases. On the basis of the determined angular position of the unbalanced mass, the spinning rotor 1 is turned such that the unbalanced mass is oriented toward the laser arrangement 2. The exact angular position of the spinning rotor 1 is a function of the shape, size and depth of the material to be removed for purposes of mass equalization to produce the predetermined identification mark 21. The control mechanism of the balancing device calculates the volume of the material to be removed as a function of spinning rotor-specific values, for example the density of the rotor material, the shape, or the dimensions of the spinning rotor 1, and determines the position, shape and depth of the identification mark required for mass equalization. When determining the removal depth, the control device 10 refers to a data memory, in which the respective relationships of shape, surface and removal depth are stored in the form of look-up tables for the different identification marks and imbalance values. Here, the removal depth is divided into steps, e.g., of 0.02 mm. However, it is alternatively possible to select other steps. The intensity and duration of the effect of the laser on the surface of the spinning rotor is also matched to the material to be removed by the control device 10. Values of 5 mg, 10 mg, 15 mg, 20 mg, etc. have been stored for the unbalanced mass. If necessary, intermediate values can be determined by interpolation. The laser arrangement 2 is actuated and the laser beam 3 thereby emitted impinges on the surface of the cylindrical-shaped section of the collar 6. The material removal takes place while the spinning rotor 1 is stopped from rotation. In order to create the desired shape of the identification mark 21, the direction of the laser beam 3 is simply, rapidly and precisely guided by the optical deflection means 15. The material is progressively removed in successive layers each extending over the entire surface of the identification mark 21, and in this manner a continuous and uniform material removal, as well as an extraordinarily even bottom surface within the identification mark 21, is achieved.

Only a single clamping is required for the method steps, in which the spinning rotor 1 remains clamped until balancing is completed, and then is released as marked and balanced. The method of the invention shortens balancing in this manner such that, in contrast to a customary method, it is possible to produce in the same amount of time as known methods up to three times the number of balanced spinning rotors, while achieving an improvement of the balancing quality and the application of an identification mark, which up to now had to be performed in prior or subsequent work steps.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for producing a spinning rotor suitable for operation at a high number of rotor revolutions in an open-end spinning machine, the method comprising the steps of initially forming the spinning rotor in a selected shape having a rotor cup and a collar, determining an imbalance in the spinning rotor and an angular position and a size of the imbalance, determining an amount of material to remove from the spinning rotor for mass equalization thereof to offset the imbalance, and removing material from the spinning rotor for equalization of the mass as a function of the angular position and size of the imbalance, the removing of material comprising forming at least one identification mark on the spinning rotor by removing material from a selected exterior surface of the rotor cup or collar and at a selected position on the exterior surface and to a selected removal depth for mass equalization of the spinning rotor.

2. The method in accordance with claim 1, characterized in that the removing of the material comprises guiding a laser beam over the selected exterior surface to create the identification mark.

3. The method in accordance with claim 2, characterized in that the guiding of the laser beam comprises deflecting the laser beam via an optical device.

4. The method in accordance with claim 1, characterized in that the removing of the material comprises calculating the depth of the identification mark as a function of the size of the selected exterior surface.

5. The method in accordance with claim 4, characterized in that the removing of the material comprises progressively increasing the removal depth.

6. The method in accordance with claim 1, characterized further by storing in look-up tables data relating shape, surface and removal depth of different identification marks.

7. The method in accordance with claim 1, characterized in that the identification mark at least partially comprises lettering.

8. The method in accordance with claims 1, characterized in that the identification mark at least partially comprises a graphic symbol.

9. The method in accordance with claim 1, characterized further by periodically calibrating the laser beam and compensating detected output deviations of the laser beam from a predetermined command value.

10. The method in accordance with claim 1, characterized in that the forming at least one identification mark on the spinning rotor comprises the steps of:

placing the spinning rotor into a receiver of a balancing device operated by means of a laser beam and causing the spinning rotor to rotate in the receiver, detecting the angular position of the spinning rotor via a marker, measuring an imbalance of the spinning rotor while being rotated by the receiver at controlled revolutions, determining a position and a size of the imbalance via a control unit of the balancing device and calculating the volume of material to be removed, using spinning rotor-specific values, determining via the control unit of the balancing device a position, shape and depth of the identification mark required for mass equalization, rotating the spinning rotor to dispose the imbalance underneath the laser beam and within an effective range of the laser beam, and while the spinning rotor is not rotating, projecting the laser beam onto the exterior surface of the spinning rotor at an intensity and for a duration of the laser beam matched to the material to be removed.

* * * * *